June 24, 1930.  J. SACHS  1,767,261

ELECTRIC METER SERVICE APPLIANCE

Filed March 17, 1927  5 Sheets-Sheet 1

Inventor
Joseph Sachs
By S. Jay Teller
Attorney

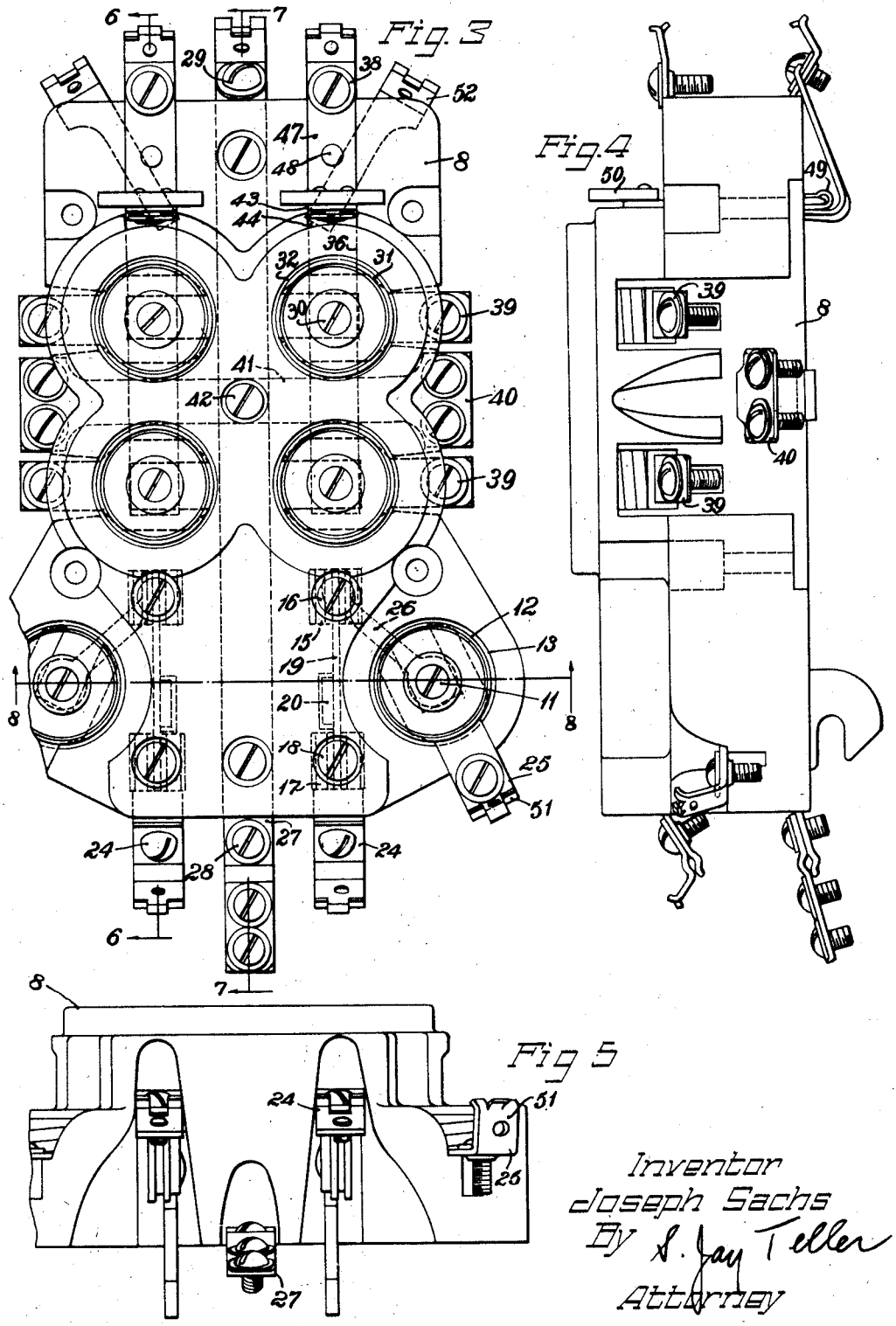

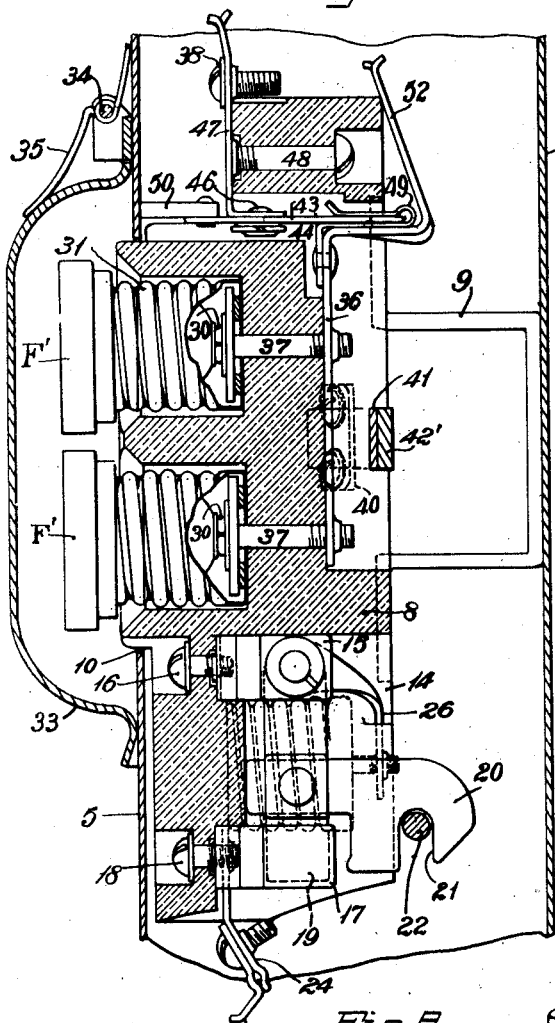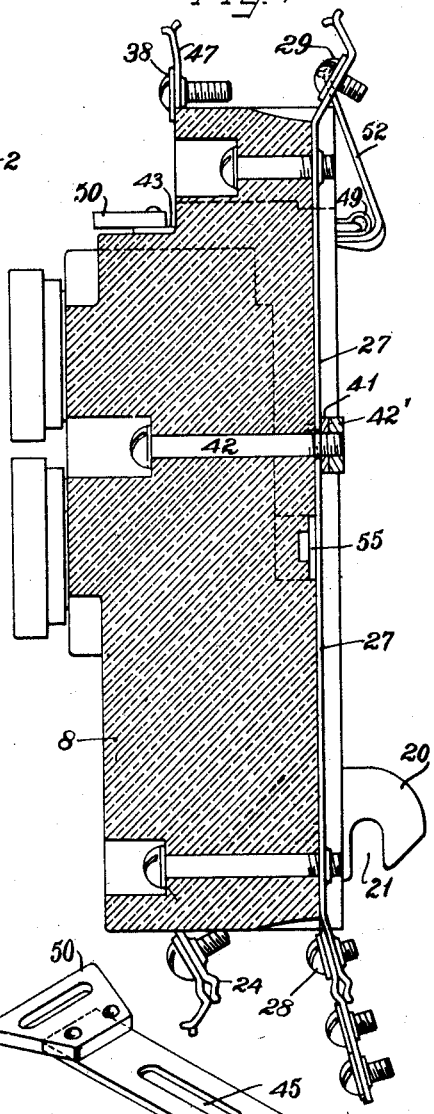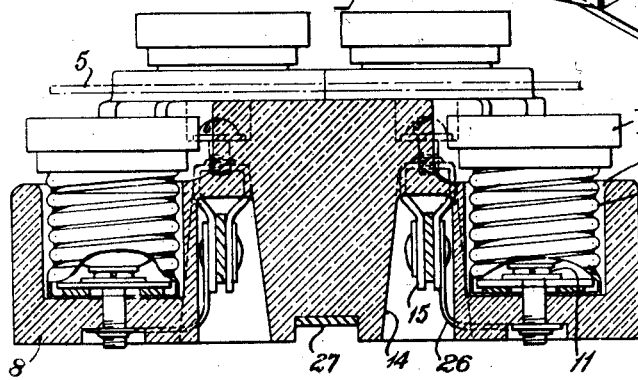

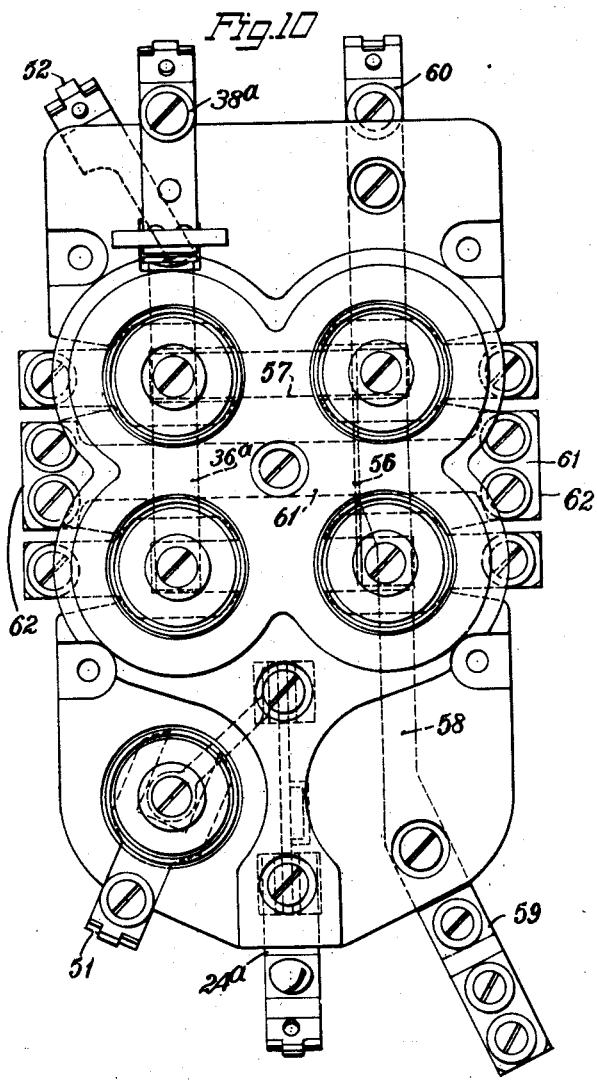
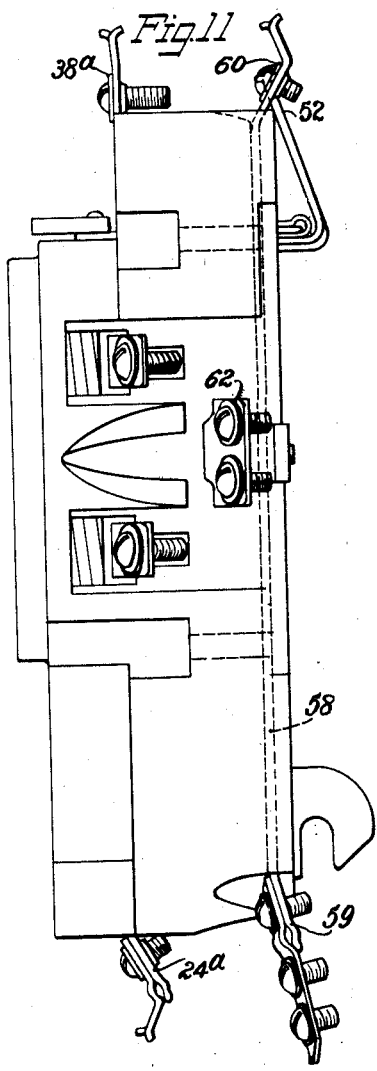
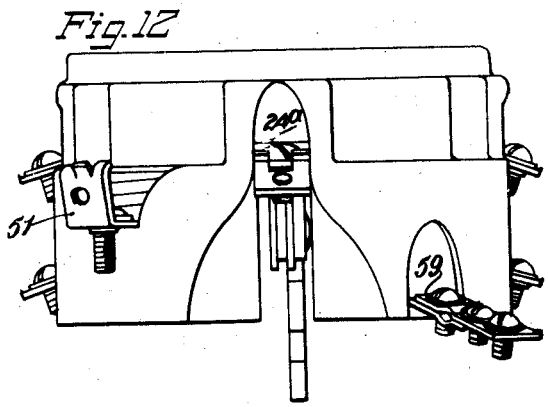

June 24, 1930.    J. SACHS    1,767,261

ELECTRIC METER SERVICE APPLIANCE

Filed March 17, 1927    5 Sheets-Sheet 5

Inventor
Joseph Sachs
By S. Jay Teller
Attorney

Patented June 24, 1930

1,767,261

UNITED STATES PATENT OFFICE

JOSEPH SACHS, OF WEST HARTFORD, CONNECTICUT

ELECTRIC-METER SERVICE APPLIANCE

Application filed March 17, 1927. Serial No. 176,270.

The invention relates particularly to an electric meter service appliance of the type disclosed in my copending application for protected electric meter service appurtenance Serial No. 579,178 filed Aug. 2, 1922, and for protected electric meter service appurtenance Serial No. 693,010 filed Feb. 15, 1924. An appliance or appurtenance of this type includes an enclosing cabinet adapted to be protectively associated with an electric meter, an automatic circuit protecting means such as a fuse within the cabinet connectible on the service side of the meter, a switch within the cabinet operable from the exterior thereof and connectible in series with the said fuse and with the meter, and another automatic circuit controlling means such as fuses connectible on the load side of the meter and arranged to be accessible from the exterior of the cabinet.

One of the objects of the present invention is to provide an appliance of the general type specified having a single insulating block or base for carrying the various conducting parts of the appliance, the various parts being separately positioned on different portions of the base so that all of the parts at the service side of the meter are on one portion and so that all of the parts at the load side of the meter are on another portion, the said portions ordinarily being separated by a horizontal plane.

A further object of the invention is to provide an appliance of the type specified having an improved arrangement of parts and of wire terminals, the arrangement being such that all of the wire terminals connectible on the service side of the meter are located at or near one end of the base, that the terminals connectible with the meter at the load side thereof are at the opposite end of the base and that the terminals connectible with the branch load wires are at one or both sides of the base.

A furthr object of the invention is to provide an appliance of the type specified having improved means for facilitating the testing of the meter. According to the customary practice in testing a meter with an appliance such as shown in either of my two aforesaid copending applications, each of the load circuits was connected with the incoming circuit by means of a jumper by-passing the meter and then each of the load circuits was disconnected from the meter by removing the load fuses from their normal contact engaging positions. This practice of using separate jumpers for the several load circuits and of disconnecting the circuits from the meter leg removing the fuses is found to be objectionable in some cases, particularly when there are more than two load circuits. In accordance with the present invention I have provided an appliance having separate movable testing links supplemental to the load side branch circuit fuses and connected in series with preferably a plurality of them so that the circuit at the load side of the meter may be interrupted for testing purposes without disturbing the normal positions of the fuses. As concerns this phase of the invention I do not necessarily limit myself to a single unitary base carrying the several parts.

A still further object of the invention is to provide an appliance of the type described having the parts peculiarly arranged in order to economize space. As already stated the service side connectible parts are preferably mounted on one portion of the base and the load side connectible parts are preferably mounted on another portion of the base, the two said portions being ordinarily arranged with the load portion vertically above the service portion. Fuse contacts and a switch are connected in series on the service portion of the base and a separately movable testing switch is mounted on the load portion of the base. With the several parts carried by two portions of the base as described it is essential that special provision be made to avoid the necessity for a base which would be excessively long vertically. In order to avoid such an excessive length I mount the service side fuse contacts and the service side switch side by side instead of one above the other and I further mount the fuses in a recess in the front and the switch in a recess in the back. In order to economize space at the testing switch the said switch is arranged so that the movable element thereof moves inward and outward substantially perpendicularly to the front face of the load portion of the base.

A still further object of the invention is to provide an improved meter testing switch, this switch being of a construction which may be advantageous whether used in combination with the other parts shown and described or used independently of such parts.

Still further objects of the invention will be apparent from the following specifications and claims.

In the accompanying drawings I have shown two embodiments of the invention but it will be understood that the drawings are intended for illustrative purposes only and are not to be construed as defining or limiting the scope of the invention, the claims forming a part of this specification being relied upon for that purpose.

Of the drawings:

Fig. 3 is a front view on an enlarged scale showing the insulating base and the parts carried thereby, the cabinet being omitted.

Fig. 4 is a side view of the parts shown in Fig. 3.

Fig. 5 is a bottom view of the parts shown in Fig. 3.

Fig. 6 is a vertical sectional view taken along the line 6—6 of Fig. 3, this view in addition showing parts of the enclosing cabinet.

Fig. 7 is a vertical sectional view taken along the line 7—7 of Fig. 3.

Fig. 8 is a horizontal sectional view taken along the line 8—8 of Fig. 3.

Fig. 9 is a detailed perspective view showing parts of one of the test switches.

Figs. 10 to 12 are views similar respectively to Figs. 3 to 5 but showing an alternate embodiment of the invention.

Figure 1:
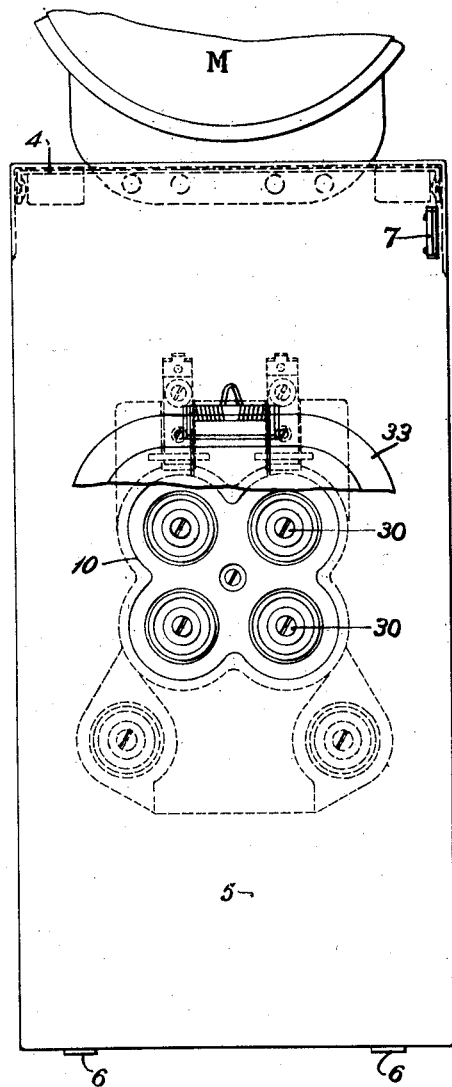
Fig. 1 is a front view of an appliance embodying the invention, certain parts being broken away in order that other parts may be more clearly shown.

Referring to the drawings, 1 represents an enclosing cabinet for the appliance as a whole, this cabinet preferably being formed of sheet metal in the usual way and having a rear wall 2, side walls 3, end walls 4, and an openable front cover 5, which may be hinged as shown at 6 to the bottom end wall. Means is provided whereby the cover may be sealed in closed position and as shown this means takes the form of a spring catch 7 having an opening therein adapted to receive any usual or suitable sealing device.

The upper end wall 4 of the cabinet is provided with an opening of such size as to permit the terminal chamber portion of an electric meter M to partly project into the cabinet. The relationship between the meter and the opening in the end wall is such that the said opening is entirely obstructed by the meter. The cabinet 1 therefore serves not only to protect the appliance contained therein, which will presently be described, but it also serves to protect the terminal portion of the meter and all of the electrical connections between the meter and the said appliance.

Located chiefly within the cabinet 1 is an insulating means which may be varied widely as to the details of its construction. In accordance with one phase of the invention the insulating means is unitary, but as concerns another phase of the invention the insulating means need not be unitary but may comprise two or more separated units. A unitary base 8 is shown and it is held in fixed position with respect to the cabinet by suitable means such as supporting elements 9 which extend forward from the rear wall 2 of the cabinet. One of these supporting elements 9 is shown in Fig. 6 and it will be understood that two such elements are ordinarily provided.

When a unitary base 8 is provided it may be regarded as having two separate portions located at opposite ends thereof and preferably one above the other and at opposite sides of a horizontal plane. One portion is intended and adapted for carrying those electrical parts which are connectible at the service side ahead of the meter and the other portion is intended and adapted for carrying those electrical parts which are connectible after or on the load side of the meter. As shown and as preferred, the service side connectible parts are on the lower portion of the base and the load side connectible parts are on the upper portion of the base.

Two separate automatic circuit protecting means are provided one of them being connectible at the service side of the meter and being located on the service portion of the base and the other being connectible on the load side of the meter and located on the load portion of the base. Each of these automatic circuit protecting means is shown as comprising one or more fuses of the screw plug type but it will be understood that I do not limit myself as concerns the exact form of circuit protecting means. The two fuses or the two sets of fuses are so arranged that the service side fuses on the service portion of the base are inaccessible from the exterior of the cabinet while the load side fuses on the load portion of the base are accessible from the exterior of the cabinet while the cabinet cover is closed and sealed.

In order that the load side fuses may be accessible as described the cabinet cover is provided with an opening 10 through which the said fuses are accessible. The base 8 is so positioned that the load portion thereof is adjacent the opening and entirely obstructs it when the cover is closed thus cooperating with the cover to prevent access to any electrical parts in the cabinet other than the said fuses and the contacts therefor. The service portion of the base is vertically separated from the said opening so that the parts carried thereby are inaccessible through the opening. All of the fuse contacts preferably face in the forward direction and the front face of the service portion is preferably behind the plane of the front face of the load portion and behind the plane of the cover, so as to provide room for the fuses behind the cover.

The construction shown in Figs. 3 to 9 is adapted for use with a three-wire circuit and the construction is preferably symmetrical, the parts at opposite sides of the vertical central plane being duplicates of each other except for reversals of positions. For the sake of simplicity I will confine the description so far as possible, to the parts at one side of the appliance.

The contacts for receiving the beforementioned fuse at the service side are represented by 11 and 12. These contacts are located in a recess 13 in the front face of the lower service portion of the base and they are positioned sufficiently to the rear of the closed position of the cover to prevent any interference between the cover and a fuse F carried by them.

A switch is also mounted on the service portion of the base preferably at the rear thereof. As shown particularly in Figs. 6 and 8 the switch is of the knife blade type and is located in a recess 14 extending forward from the rear face of the base. The recess 13 for the fuse contacts and the recess 14 for the switch are preferably side by side as shown. The switch comprises a hinge contact 15 held in place by screw 16 and a rupture contact 17 held in place by screw 18. The switch also comprises a blade 19 pivoted to the clip 15 and movable into and out of engagement with the clip 17. The blade 19 carries an operating member 20 of insulating material, this member being slotted at 21 to receive the cranked portion of an operating spindle 22. This spindle is seated in bearing apertures in the side walls 3, 3 of the cabinet and it terminates in a handle 23 on the outside of the cabinet. When there are two switches at the respective sides of the base both switches are operated by means of the same operating spindle and the same handle, and both of these switches can be opened or closed by means of the handle without opening the cabinet.

The switch clip 17 is connected with a wire connecting terminal 24 and the fuse contact 12 is connected with a wire connecting terminal 25. The switch clip 15 and the fuse contact 11 are electrically connected together by means of a conductor element 26.

As already stated the switch and fused parts already described as located at the righthand side of the base are duplicated at the lefthand side and these two sets of parts serve for the controlling of two legs of a circuit. Incoming service wires may be connected with the terminals 24, 24 and wires leading to the service side of the meter may be connected with the two terminals 25. The switches and fuses are thus connected in series with the meter at the service side thereof. When the appliance is to be used in connection with a three-wire circuit, a third or neutral conductor 27 may be provided extending vertically preferably from the bottom of the base to the top thereof. This neutral conductor is preferably located at or near the rear face of the base, being held in place by screws as clearly shown in Figs. 7 and 8. The neutral conductor 27 is provided with a wire connecting terminal 28 at its lower end and with a wire connecting terminal 29 at its upper end. With a three-wire circuit the neutral service wire is connected with the terminal 28.

The contacts for receiving the aforesaid load side branch circuit fuses are mounted upon the load portion of the base and they are so located thereon as to be accessible through the beforementioned opening 10 in the cover 5. I have shown four pairs of branch circuit fuse contacts but I do not necessarily limit myself to this particular number of contacts, as the number may be varied in accordance with conditions to be taken care of. As shown, there are two pairs of contacts 30 and 31 at each side of the center of the base and located in recesses 32, 32 in the front thereof. Preferably the material of the base surrounding the said recesses 32, 32 extends forward for a short distance through the opening 10 so as to more effectively close and obstruct the said opening. The arrangement is such that fuses F', F' carried by the contacts project forward so as to be easily accessible from the front when the cover is in closed position. Preferably an auxiliary cover 33 is provided for protecting the fuses F', F'. As shown this auxiliary cover is hinged to the main cover 5 at 34, a spring 35 being provided for normally holding the auxiliary cover in closed position.

At each side of the base there is provided a conductor which is connected with one of the branch circuit fuse contacts of each of the said pairs of such contacts at the said side. This conductor is illustrated at 36 and it extends vertically, being connected with the central fuse contacts 30, 30 by means of screws 37, 37. Preferably and as illustrated the heads of said screws constitute the said central contacts 30, 30 and the said screws also serve to hold the conductor 36 in place. The two conductors 36 are electrically connected respectively with wire receiving terminals 38, 38. The outer fuse contacts of the last said pairs are connected respectively with wire receiving terminals 39, 39 which are electrically insulated from each other.

Preferably also located at each side of the base is a wire receiving terminal 40 which is connected with the neutral conductor 27. Preferably and as shown the two terminals 40, 40 are at the ends of a transverse conductor 41 which crosses the neutral conductor 27 as clearly shown in Fig. 7. The two conductors 41 and 27 are held in contact with each other by means of a screw 42. The screw 42 is shown as engaging a transverse strap 42' which may extend substantially the entire length of the conductor 41 to mechanically reinforce it. Preferably each of the aforesaid terminals 40, 40 is provided with two binding screws to permit the attachment of two separate wires thereto. It will be observed particularly by reference to Fig. 6 that the transverse neutral conductor 41 and the vertical conductors 36 are located in different planes so as to be sufficiently separated from each other to avoid any possibility of a short circuit.

Preferably, as clearly shown in Fig. 3, the several wire terminals adapted to be connected at the service side of the meter are located adjacent the lower edge of the base. The terminals 29 and 38 are adapted to be connected with wires leading from the meter at the load side thereof and these are preferably arranged adjacent the upper edge of the base. The terminals 39, 39 and 40 are adapted to be connected with load circuit wires and these are preferably arranged adjacent one or both of the side edges of the base. This arrangement of the several wire terminals greatly simplifies the wiring of the appliance for service. Inasmuch as the terminals of the respective classes are grouped together and have their distinctive positions on the base any possibility of incorrect wiring is reduced to a minimum.

The conductor 36 has been described as connected with the terminal 38. Preferably instead of providing a direct and permanent connection between these two parts I provide a connection which includes a manually movable link or switch which permits the connection to be broken when desired. This link or switch is used for testing purposes its function being to disconnect the load side of the meter from the load wires during testing.

As concerns certain of the broader phases of the invention, the details of construction of the testing link or switch can be widely varied. Preferably, however, and in accordance with other phases of the invention the testing switch includes a blade which is movable forward and backward perpendicularly with the front face of the base. As illustrated there is a blade 43 which is movable perpendicularly as aforesaid. This blade is located in a suitable opening 44 in the base extending rearward from the front thereof. As shown clearly in Fig. 9 the blade 43 is provided with a slot 45 through which extends a rivet 46 which rivet is carried by a conductor 47 terminating in the aforesaid wire receiving terminal 38. The conductor 47 is held in place by means of a screw 48. Carried by the conductor 36 is a spring clip 49 with which the inner end of the blade 43 is adapted to engage as clearly shown in Fig. 6. The rivet 46 together with a washer thereon serves to establish an electrical connection between the blade 43 and the conductor 47, but nevertheless permits the blade 43 to be moved outward or inward within the limits of motion determined by the length of the slot 45. With the parts in the relative positions shown in Fig. 6 an electrical connection is established from the wire terminal 38 through the conductor 47, the blade 43, the clip 49 and the conductor 36 to the fuse contacts 30, 30. When the blade 43 is moved forward to disengage the clip 49 the aforesaid electrical connection is broken.

Figure 2:
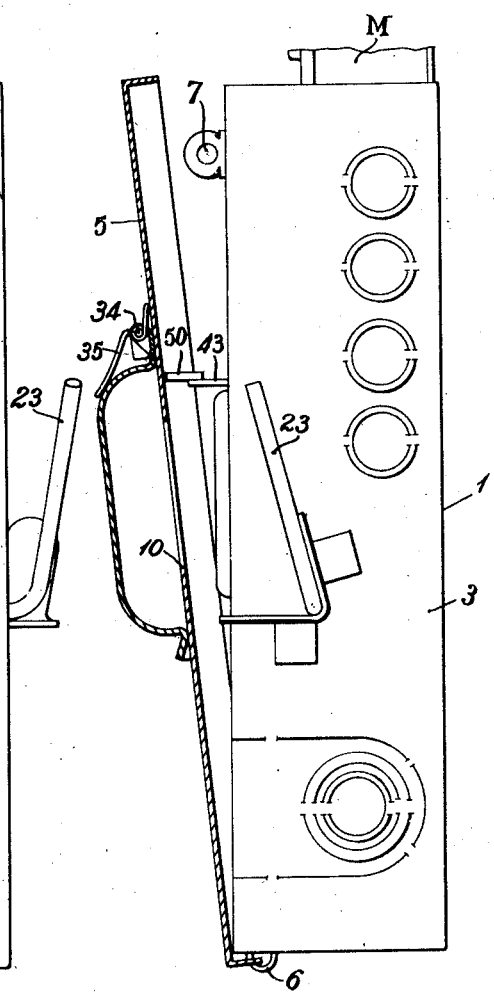
Fig. 2 is a side view of the parts shown in Fig. 1, the cabinet cover being shown in section along a central vertical plane.

For convenience in manipulation the blade 43 carries a handle 50 of insulating material. Preferably the handle 50 is of such a size and the relation of the positions of the parts is such that the said handle 50 is substantially in contact with the cover 5 of the cabinet when the blade 43 is in its circuit making position and when the cover 5 is closed. Inasmuch as the blade is movable forward and backward it will be obvious that the backward movement thereof may be effected by reason of the engagement between the cover 5 and the handle 50. Obviously the cover 5 must be moved to open position before the handle can be reached to move the blade 43 forward for testing purposes. At the conclusion of the test the blade 43 may be returned rearward to its normal position manually, but if the testing inspector fails to so move it it will be automatically moved rearward by means of the cover 5 when the said cover is moved to closed position. This interengagement between the cover 5 and the handle 50 is clearly shown in Fig. 2 which illustrates the cover 5 in a partly open position and about to be closed. It is obvious that as the cover is closed the handle 50 and the blade 43 will be moved rearward.

Provision is made for the convenient connection of a jumper or by-pass test connector for supplying current to the load circuits independently of the meter while the meter is being tested. For this purpose the terminal 25 is provided with a contact 51 and a similar contact 52 is provided which is electrically connected between the rupture end of the testing link 43 and the branch circuit fuse contacts. As shown the contact 52 is directly connected with the conductor 36. As clearly shown in Fig. 6 the contact 52 may be formed as an integral extension of the conductor 30. These two contacts may be conveniently connected by a test connector. It will be obvious that when contacts 51 and 52 are electrically connected the circuit will extend from the service wires to the load wires entirely independently of the meter and independently of the testing switch. The meter can then be disconnected from the load wires by moving the blade 43 forward as already described. Other test contacts are provided in connection with the wire terminals 24, 29 and 38.

It will be observed that the test contact 52 is connected in advance of the load side branch circuit fuse contacts so that one jumper serves for a plurality of side load branch circuits and so that the load side fuses are in the respective branch circuits and serve to protect them while the test is being made. This is in contrast with the prior practice wherein the test contact or contacts had to be located after the load side branch fuses in order that these fuses might serve as means for disconnecting the meter. This prior practice was open to the objection that a separate jumper or by-pass connection had to be provided for each branch circuit around its fuse or fuses and it was also open to the further objection that the branch circuits were without their own individual fuse protection during testing.

It will be understood that as concerns the provision of the testing link or switch in combination with the load fuses I do not necessarily limit myself to a unitary base such as I have shown and described. In so far as concerns the broader aspects of the combination of the testing link or switch with the load fuses it is immaterial whether a unitary insulating base be provided or whether an insulating means be provided comprising two or more separate units.

Figure 13:
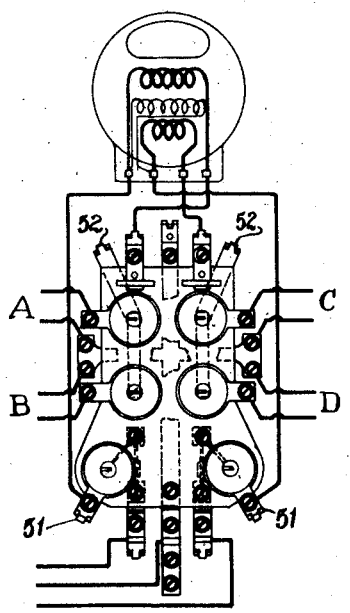
Figs. 13 to 15 are electrical diagrams showing different wiring connections for the construction shown in Figs. 3 to 9.

In Fig. 13 I have shown wiring connections whereby four branch circuits A, B, C, and D are connected with a three-wire system. It will be noted that a single load fuse is provided for each branch circuit, the neutral connection in each case being unfused. For testing purposes the contacts 51, 51 are connected respectively with the contacts 52, 52 thus by-passing the meter as already described and providing connection with all of the load circuits. All of the fuses remain in place for protecting the several circuits.

Figure 14:
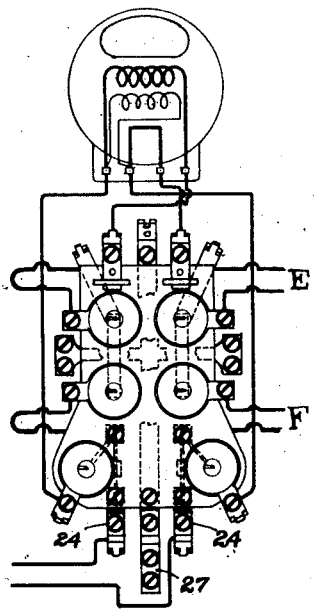

In Fig. 14 I have shown wiring connections for a two-wire system, the service wires being connected to the terminals 24, 24. The neutral conductor 27 and the parts connected therewith are not used. With the wires connected as shown two fuses are provided for each of the two branch circuits E and F.

Figure 15:
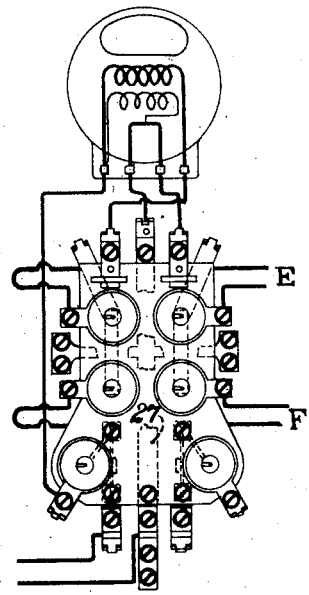

In Fig. 15 I have shown alternate wiring connections also adapted for a two-wire system. In this case one of the service wires is connected with the meter through the conductor 27, this leg of the circuit being non-switching and unfused. The switch and service fuse at the right may be omitted if desired. The wiring connections are otherwise the same as shown in Fig. 14, two load branches E and F being provided.

Figure 16:
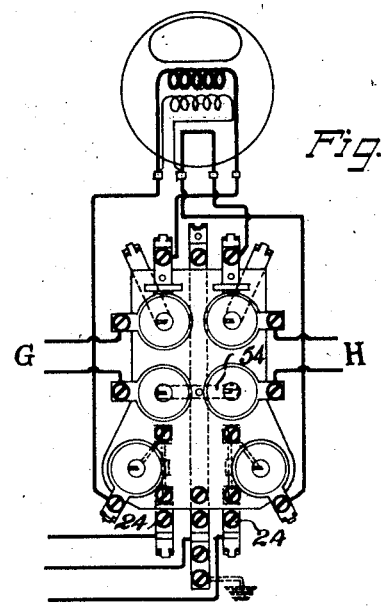
Fig. 16 is an electrical diagram showing the connections for a modified form of the construction shown in Figs. 3 to 9.

In Fig. 16 I have shown wiring connections which require somewhat different connections on the base. Those portions of the two conductors 36 which connect the two central fuse contacts 30, 30 are omitted, the conductors 36 extending only to the upper central fuse contacts. The transverse neutral conductor 41 with its terminals is also omitted and in lieu thereof there is provided a transverse conductor 54 which is connected with the neutral conductor 27 and with the central contacts for the two lower load fuses. This transverse conductor 54 is located in a groove 55 which is provided in the base 8 as clearly shown in Fig. 7. This modification adapts the device for use with a three-wire system having a grounded neutral. The two live circuit wires are connected respectively with the terminals 24, 24 and the connections extend as already described to the upper load fuses and thence to two wires of the respective branch circuits G and H. The other wires of the said branch circuits are connected with the lower load fuses which are connected with the grounded neutral by means of the transverse conductor 54. Thus each load circuit is provided with two fuses.

I have already explained that the construction as described can be used for a two-wire system. Obviously, however, when so used connections can be made with only two branch circuits each of the said circuits being provided with two fuses. In Figs. 10 to 12 I have provided an alternate construction which is primarily intended for a two-wire system and which is so constructed that connections can be made with four branch circuits.

Referring particularly to Figs. 10 to 12 it will be observed that the construction at the lefthand side is substantially the same as that already described in connection with Figs. 3 to 9 and that repetition of the description will be unnecessary. It will be noted, however, that the arrangement is such that the service wire terminal 24$^a$ and the switch connected therewith are located at the center of the block. The center fuse contacts for the lefthand load side branch circuit fuses are connected with each other and with the terminal 38$^a$ by means of a conductor 36$^a$ and other parts as already described. In addition the central contacts for the branch circuit fuses at the right of the base are also connected with the terminal 38ª. For this purpose there are provided a vertical conductor 56 and a transverse conductor 57, all located at the back of the base and in substantially the same plane as the conductor 36ª. Thus all four of the central contacts for the branch circuit fuses are connected with each other and with the wire terminal 38ª.

A non-switching and unfused conductor 58 is provided for the other leg of the circuit. This conductor is provided with a wire terminal 59 at its lower end and with a wire terminal 60 at its upper end. This conductor 58 is located in a plane at the rear of the plane in which the conductors 36ª, 56 and 57 are located its position being in this respect similar to that of the conductor 27 shown in Fig. 7 and already described. A transverse conductor 61 is provided which is connected with the conductor 58 and which is provided at its ends with wire terminals 62, 62 each having two binding screws to permit the attachment of two separate wires thereto.

Figure 17:
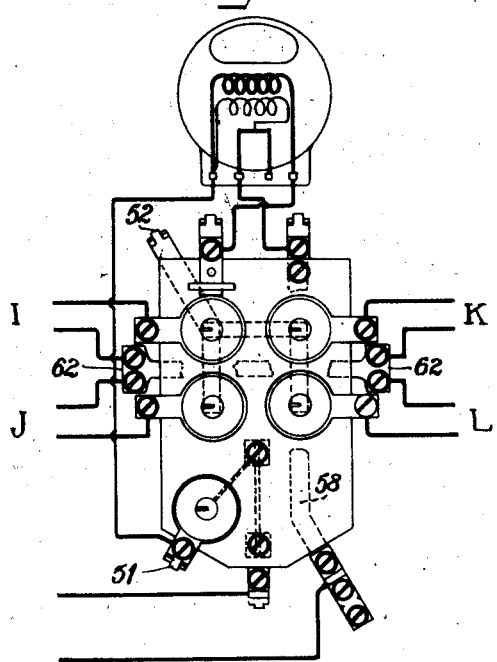
Fig. 17 is an electrical diagram showing a wiring connection for the construction shown in Figs. 10 to 12.

In Fig. 17 I have shown wiring connections such as may be used in connection with the construction shown in Figs. 10 to 12. It will be noted that the circuit at the lefthand side extends through the switch and the service side fuse to the meter and that the circuit extends from the meter through the test switch to the central contacts of all four load fuses. The outer contacts for the four load fuses are connected respectively with the four branch circuits I, J, K, L. The remaining wires of the said four branch circuits are connected with the terminals 62, 62 which terminals are connected with the conductor 58 and through this conductor with the other service wire. It will be observed that a direct connection independent of the meter can be established to the several branch circuits by connecting the contacts 51 and 52 and that the meter can be disconnected from the branch circuit wires by opening the single test switch which is provided.

Some of the features of the present invention are disclosed in my patent for electric circuit controlling appliance No. 1,754,442 issued April 15, 1930. As to these features the present application bears a continuing relationship with the application upon which the said patent was issued.

What I claim is:

1. An enclosed switch and fuse device comprising in combination, a cabinet including an openable flat front cover having an opening therein, means whereby the cover may be sealed in closed position, a unitary insulating base in the cabinet having service and load portions located at opposite ends thereof, the said service portion being separated from the said opening in the cover and the said load portion being immediately adjacent the said flat cover and serving to normally close the opening therein, a switch and a pair of fuse contacts connected in series with each other and connectible on the service side of a meter, the said switch and fuse contacts being located on the service portion of the base and being inaccessible through the said opening in the cover, means operable from the exterior of the cabinet for opening and closing the switch, and a pair of fuse contacts for a branch load circuit connectible on the load side of the meter and mounted on the load portion of the base in position to be accessible through the said opening in the cover.

2. An enclosed switch and fuse device comprising in combination, a cabinet including an openable flat front cover having an opening therein, means whereby the cover may be sealed in closed position, a unitary insulating base in the cabinet having service and load portions located oppositely with respect to a horizontal plane, the said service portion being vertically separated from the said opening in the cover and the said load portion being immediately adjacent the said flat cover and serving to normally close the opening therein, a switch and a pair of fuse contacts connected in series with each other and connectible on the service side of a meter, the said switch and fuse contacts being located respectively at the front and at the rear of the service portion of the base and being inaccessible through the said opening in the cover, means operable from the exterior of the cabinet for opening and closing the switch, and a pair of fuse contacts for a branch load circuit connectible on the load side of the meter and mounted on the load portion of the base in position to be accessible through the said opening in the cover.

3. An enclosed switch and fuse device comprising in combination, a cabinet including an openable flat front cover having an opening therein, means whereby the cover may be sealed in closed position, a unitary insulating base in the cabinet having service and load portions located at opposite ends thereof, the said service portion being separated from the said opening in the cover and having its front face behind and separated from the plane of the cover and the said load portion having its front face immediately adjacent the flat cover and the said opening therein so that the opening is normally closed, a pair of forward facing fuse contacts connectible on the service side of a meter and located in a recess at the front of the service portion of the base so as to be behind the cover and inaccessible through the said opening therein, a switch connected in series with the said fuse contacts and located in a recess in the back of the service portion of the base and at one side of the recess containing the fuse contacts, means operable from the exterior of the cabinet for opening and closing the switch, and a pair of forward facing fuse contacts for a branch load circuit connectible on the load side of the meter and mounted on the load portion of the base in position to be accessible through the said opening in the cover.

4. An enclosed switch and fuse device comprising in combination, a cabinet including an openable flat front cover having an opening therein, means whereby the cover may be sealed in closed position, a unitary insulating base in the cabinet having service and load portions located oppositely with respect to the horizontal plane, the said service portion being vertically separated from the said opening in the cover and the said load portions being immediately adjacent the said opening flat cover and serving to normally close the opening therein, a switch and a pair of fuse contacts connected in series with each other and located on the service portion of the base so as to be inaccessible through the said opening in the cover, means operable from the exterior of the cabinet for opening and closing the switch, two wire connecting terminals mounted on the service portion of the base and connected with the said switch and fuse contacts, the said terminals being connectible respectively with an incoming service wire and with a wire leading to the service side of an electric meter, a pair of fuse contacts for a branch load circuit mounted on the load portion of the base in position to be accessible through the said opening in the cover, and two wire connecting terminals mounted on the load portion of the base and connected respectively with the two load circuit fuse contacts, the said terminals being connectible respectively with a wire leading from the load side of the meter and with an outgoing load circuit wire.

5. A switch and fuse device comprising in combination, a unitary insulating base, a switch and a pair of fuse contacts mounted on the base and connected in series with each other, a plurality of wire connecting terminals mounted on the base adjacent one end edge thereof and connectible with incoming service wires, one of the said terminals being connected with the said switch and fuse contacts, a plurality of wire connecting terminals on the base adjacent the opposite end edge thereof and connectible with wires leading from an electric meter at the load side thereof, a plurality of pairs of load side branch circuit fuse contacts on the front of the base connected with at least one of the last said terminals, and a plurality of wire connecting terminals on the base connected respectively with the branch circuit fuse contacts and respectively located adjacent the two opposite side edges of the base, the last said terminals being connectible with branch circuit load wires.

6. An enclosed switch and fuse device comprising in combination, a cabinet including an openable front cover having an opening therein, means whereby the cover may be sealed in closed position, a unitary insulating base in the cabinet having service and load portions located at opposite ends thereof, the said service portion being separated from the said opening in the cover and the said load portions being adjacent the said opening and serving to normally close it, a switch and a pair of fuse contacts connected in series with each other and located on the service portion of the base so as to be inaccessible through the said opening in the cover, means operable from the exterior of the cabinet for opening and closing the switch, a plurality of wire connecting terminals mounted on the service portion of the base adjacent the end edge thereof and connectible with incoming service wires, one of the said terminals being connected with the said switch and fuse contacts, a wire connecting terminal adjacent the opposite end edge of the base and connectible with a wire leading from an electric meter at the load side thereof, a plurality of pairs of load side branch circuit fuse contacts connected with the last said terminal and mounted on the front of the load portion of the base in position to be accessible through the said opening in the cover, and a plurality of wire connecting terminals connected respectively with the branch circuit fuse contacts and located adjacent at least one of the opposite side edges of the base, the last said terminals being connectible with branch circuit load wires.

7. A switch and fuse device comprising in combination, a unitary insulating base, a switch and a pair of fuse contacts mounted on the base and connected in series with each other, a plurality of wire connecting terminals mounted on the the base adjacent the lower edge thereof and connectible with incoming service wires, one of the said terminals being connected with the said switch and fuse contacts, a plurality of wire connecting terminals on the base adjacent the upper edge thereof and connectible with wires leading from an electric meter at the load side thereof, at least two pairs of load side branch circuit fuse contacts on the front of the base at opposite sides of the center thereof and connected with at least one of the last said terminals, a vertically extending conductor on the base connected with one of the first said wire terminals, a transverse conductor on the base connected with the vertical conductor, and at least four wire connecting terminals on the base connected respectively with the said branch circuit fuse contacts and with the ends of the transverse conductor, the said terminals being respectively located adjacent the two opposite side edges of the base and being connectible with branch circuit load wires.

8. A switch and fuse device comprising in combination a unitary insulating base, a switch and a pair of fuse contacts mounted on the base and connected in series with each other, a plurality of wire connecting terminals mounted on the base, and connectible with incoming service wires, one of the said terminals being connected with the said switch and fuse contacts, a wire connecting terminal on the base connectible with a wire leading from an electric meter at the load side thereof, two pairs of load side branch circuit fuse contacts arranged one above the other on the front of the base, means for connecting one contact of each of the said pairs of contacts with the last said terminal, the said means including a vertical conductor between the fuse contacts and adjacent the back of the base, a second vertically extending conductor on the base connected with one of the first said wire terminals, a transverse conductor on the base connected with the last said vertical conductor and extending transversely of the first said vertical conductor in a different plane, an at least three wire connecting terminals on the base adjacent a side edge thereof, the said terminals being connected respectively with the said branch circuit fuse contacts and with the end of the said transverse conductor.

9. A switch and fuse device comprising in combination, a unitary insulating base, a switch and a pair of fuse contacts mounted on the base and connected in series with each other, a plurality of wire connecting terminals mounted on the base and connectible with incoming service wires, one of the said terminals being connected with the said switch and fuse contacts, two wire connecting terminals on the base connectible with wires leading from an electric meter at the load side thereof, two pairs of load side branch circuit fuse contacts arranged one above the other on the front of the base at one side of the center thereof, means for connecting one contact of each of the said pairs of contacts with one of the last said terminals, the said means including a vertical conductor between the fuse contacts and adjacent the back of the base, two other pairs of load side branch circuit fuse contacts arranged one above the other on the base at the other side of the center thereof, means for connecting one contact of each of the last said pairs with the other of the last said terminals, the said means including a second vertical conductor between the said fuse contacts and adjacent the back of the base, a third centrally located vertical conductor on the base connected with one of the first said wire terminals, a transverse conductor on the base connected with the last said vertical conductor and extending transversely of the first and second vertical conductors in a different plane, at least six wire connecting terminals on the base with three adjacent one side edge thereof and three adjacent the opposite side edge thereof the said terminals being connected respectively with the said branch circuit fuse contacts and with the opposite ends of the said transverse conductor.

10. An enclosed switch and fuse device comprising in combination, a cabinet including in combination, a cabinet including an openable front cover, one wall of the cabinet having an opening therein, means whereby the cover may be sealed in closed position, an insulating member carried by the cabinet adjacent the said opening in the cabinet wall and normally serving to close it, a switch and a pair of fuse contacts in the cabinet connected in series with each other and connectible on the service side of a meter, the said switch and fuse contacts being located so as to be inaccessible through the said opening in the cabinet wall, means operable from the exterior of the cabinet for opening and closing the switch, a pair of load side branch circuit fuse contacts mounted on the insulating member in position to be accessible through the said opening in the cabinet wall and connectible on the load side of the meter, a testing link in the cabinet connectible between the meter and the load side fuse contacts and inaccessible through the opening in the cover, the said testing link being manually operable when the cover is open independently of the first said switch and with the load side fuse contacts remaining in their normal positions, and two contacts adapted for the attachment of a by-passing testing connector and located in the cabinet to be inaccessible through the said opening, one contact being connected with the circuit ahead of the meter and the other being connected with the circuit between the rupture end of the testing link and the branch circuit fuse contacts.

11. An enclosed switch and fuse device comprising in combination, a cabinet including an openable front cover, one wall of the cabinet having an opening herein, means whereby the cover may be sealed in closed position, an insulating member carried by the cabinet adjacent the said opening in the cabinet wall and normally serving to close it, a switch and a pair of fuse contacts in the cabinet connected in series with each other and connectible on the service side of a meter, the said switch and fuse contacts being located so as to be inaccessible through the said opening in the cabinet wall, means operable from the exterior of the cabinet for opening and closing the switch, a plurality of pairs of load side branch circuit fuse contacts mounted on the insulating member in position to be accessible through the said opening in the cabinet wall, means in the cabinet for connecting the said pairs of branch circuit fuse contacts in parallel with each other, a testing link in the cabinet inaccessible through the opening in the cover and manually operable when the cover is open independently of the first said switch, the said testing link being connectible between the meter and the branch circuit fuse contacts, and two contacts adapted for the attachment of a by-passing testing connector and located in the cabinet to be inaccessible through the opening in the cover, one contact being connected with the circuit ahead of the meter and the other being connected with the circuit between the rupture end of the testing link and the branch circuit fuse contacts.

12. An enclosed switch and fuse device comprising in combination, a cabinet including an openable front cover having an opening therein, means whereby the cover may be sealed in closed position, a unitary insulating base in the cabinet having a portion located adjacent the said opening in the cover and serving to close it, a switch and a pair of fuse contacts on the base connected in series with each other and connectible on the service side of a meter, the said switch and fuse contacts being located so as to be inaccessible through the said opening in the cover, means operable from the exterior of the cabinet for opening and closing the switch, a pair of load side branch circuit fuse contacts mounted on the base in position to be accessible through the said opening in the cover and connectible on the load side of the meter, a testing switch on the base inaccessible through the opening in the cover and manually operable when the cover is open independently of the first said switch, the said testing switch being connectible between the meter and the branch circuit fuse contacts, and two contacts on the base adapted for the attachment of a by-passing testing connector and located in the cabinet to be inaccessible through the opening in the cover, one contact being connected with the circuit ahead of the meter and the other being connected with the circuit between the rupture end of the testing switch and the branch circuit fuse contacts.

13. An enclosed switch and fuse device comprising in combination, a cabinet including an openable front cover having an opening therein, means whereby the cover may be sealed in closed position, a unitary insulating base in the cabinet having service and load portions located at opposite ends thereof, the said service portion being separated from the said opening in the cover and the said load portion being adjacent the said opening and serving to normally close it, a switch and a pair of fuse contacts connected in series with each other and connectible on the service side of a meter, the said switch and fuse contacts being located on the service portion of the base and being inaccessible through the said opening in the cover, means operable from the exterior of the cabinet for opening and closing the switch, a pair of fuse contacts for a branch load circuit connectible on the load side of the meter and mounted on the load portion of the base in position to be accessible through the said opening in the cover, and a manually operable testing switch connectible between the meter and the load fuse contacts, the said testing switch being mounted on the load portion of the base so as to be inaccessible through the said opening in the cover.

14. An enclosed switch and fuse device comprising in combination, a cabinet including an openable front cover having an opening therein, means whereby the cover may be sealed in closed position, a unitary insulating base in the cabinet having service and load portions located oppositely with respect to a horizontal plane, the said service portion being vertically separated from the said opening in the cover and the said load portion being adjacent the said opening and serving to normally close it, a switch and a pair of fuse contacts connected in series with each other and connectible on the service side of a meter, the said switch and fuse contacts being located on the service portion of the base and being inaccessible through the said opening in the cover, means operable from the exterior of the cabinet for opening and closing the switch, a pair of load side branch circuit fuse contacts connectible on the load side of the meter and mounted on the load portion of base in position to be accessible through the said opening in the cover, a test switch mounted on the load portion of the base and positioned to be inaccessible through the opening in the cover, the said test switch being manually operable when the cover is open independently of the first said switch and being connectible between the meter and the branch circuit fuse contacts, and two contacts adapted for the connection of a by-passing test connector and located on the base to be inaccessible through the opening in the cover, one contact being connected with the circuit ahead of the meter and the other being connected with the circuit between the rupture end of the test switch and the branch circuit contacts.

15. A fused switch device adapted for meter testing comprising in combination, an insulating base, a switch on the base, means for connecting the said switch with an incoming service wire and with an electric meter at the service side thereof, a pair of load side branch circuit fuse contacts on the front of the base adapted to be connected on the load side of the meter, means for connecting the said fuse contacts with a load circuit wire, and a testing switch on the base connectible between the meter and the branch circuit fuse contacts, the said testing switch comprising a stationary contact and a blade slidably movable substantially perpendicularly to the front face of the base into or out of engagement with the stationary contact.

16. A fused switch device adapted for meter testing comprising in combination, an insulating base, a switch on the base, means for connecting the said switch with an incoming service wire and with an electric meter at the service side thereof, a pair of load side branch fuse contacts on the front of the base adapted to be connected on the load side of the meter, means for connecting the said fuse contacts with a load circuit wire, and a testing switch on the base connectible between the meter and the branch circuit fuse contacts, the said switch comprising two stationary contacts respectively adjacent the back of the base and adjacent the front of the base and a blade slidably movable substantially perpendicularly to the front face of the base into or out of engagement with one of the stationary contacts.

17. A fused switch device adapted for meter testing comprising in combination, an insulating base having an opening extending from the front to the back thereof a switch on the base, means for connecting the said switch with an incoming service wire and with an electric meter at the service side thereof, a pair of load side branch circuit fuse contacts on the front of the base adapted to be connected on the load side of the meter, means for connecting the said fuse contacts with a load circuit wire, and a testing switch on the base connectible between the meter and the fuse contacts, the said switch comprising two stationary contacts respectively adjacent the back of the base and adjacent the front of the base at the said opening therein and a blade slidably movable through the said opening into or out of engagement with one of the stationary contacts.

18. An enclosed switch and fuse device comprising in combination, a cabinet including a forwardly openable front cover having an opening therein, an insulating base in the cabinet, a switch on the base, means for connecting the said switch with an incoming service wire and with an electric meter at the service side thereof, a pair of load side branch circuit fuse contacts on the front of the base adapted to be connected on the load side of the meter, means for connecting the said fuse contacts with a load circuit wire, and a testing switch on the base connectible between the meter and the branch circuit fuse contacts and comprising a stationary contact and a blade slidably movable substantially perpendicularly to the front face of the base into or out of engagement with the stationary contact, the said testing switch being so positioned with relation to the front cover of the cabinet that the said cover upon being closed will engage the said switch to close it.

In testimony whereof I have hereunto set my hand this 10th day of March, 1927.

JOSEPH SACHS.